Patented Dec. 14, 1943

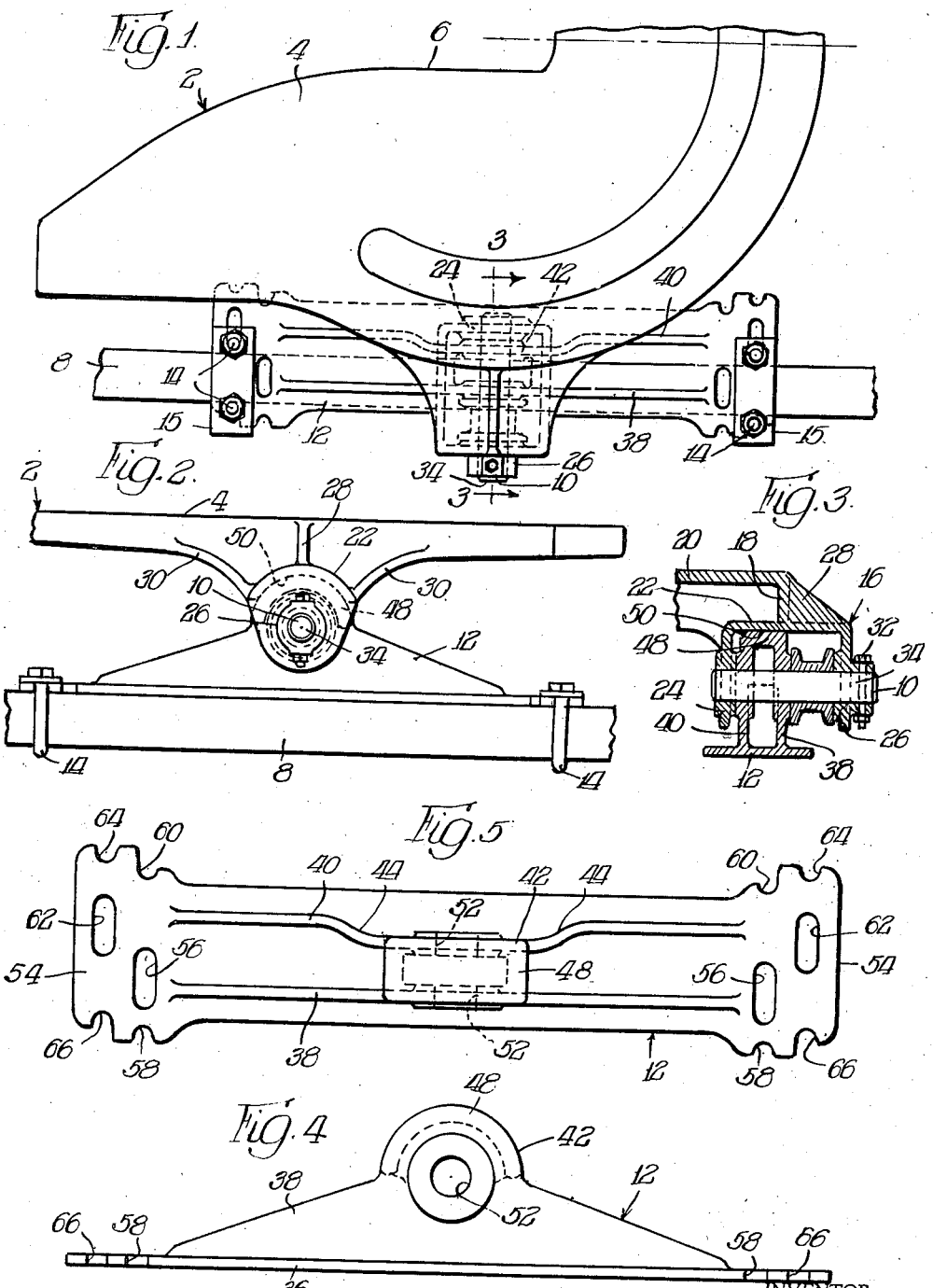

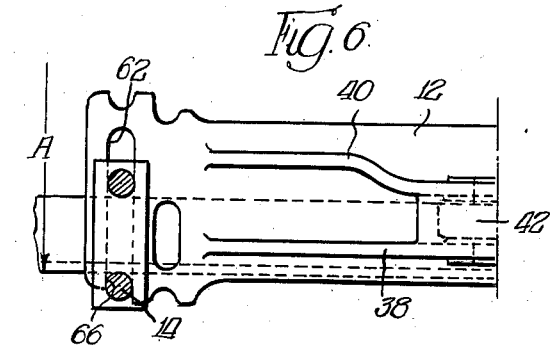
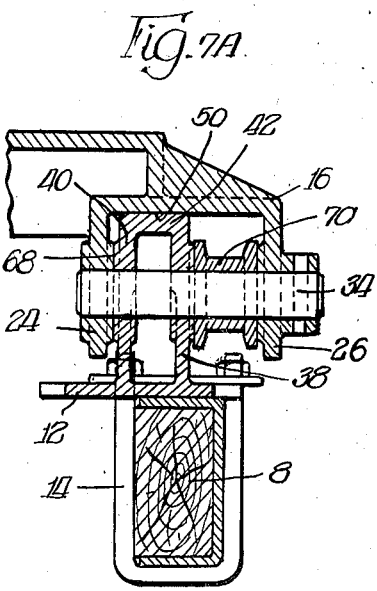
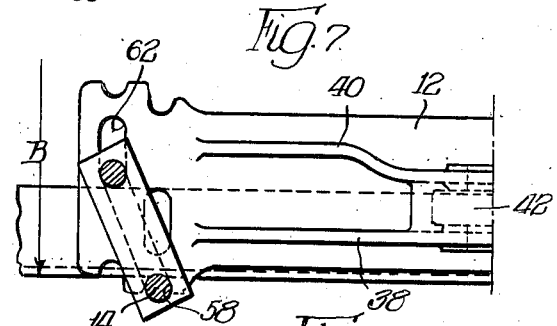
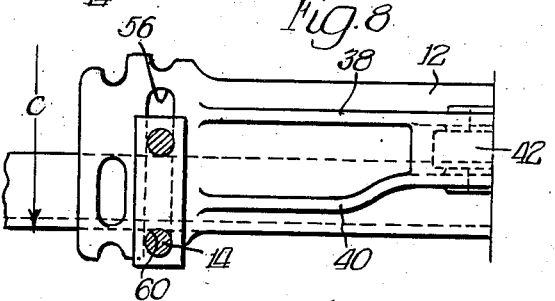
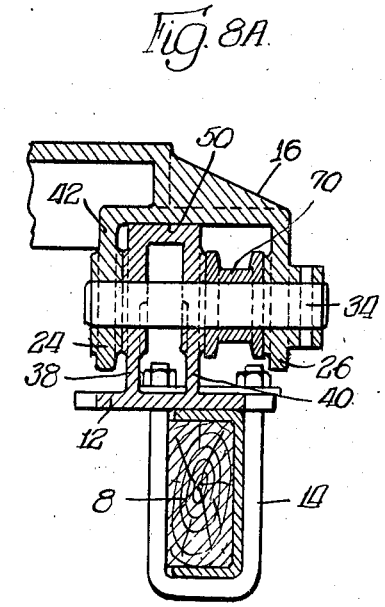
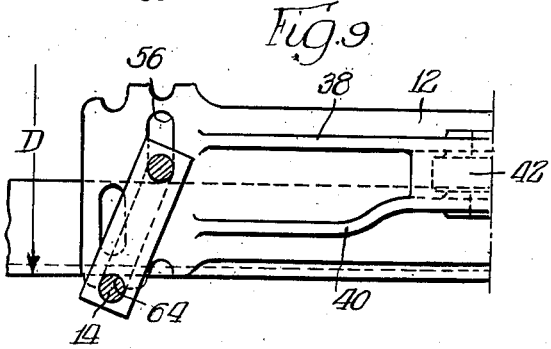

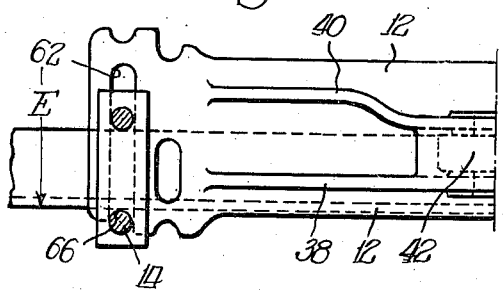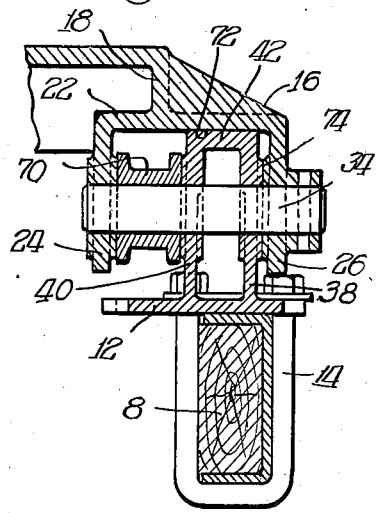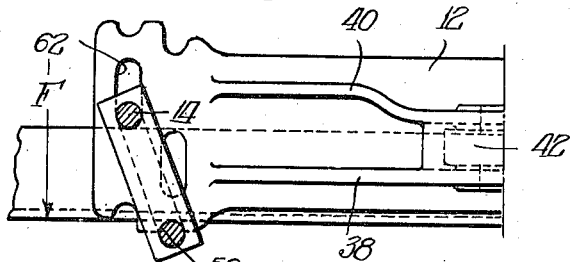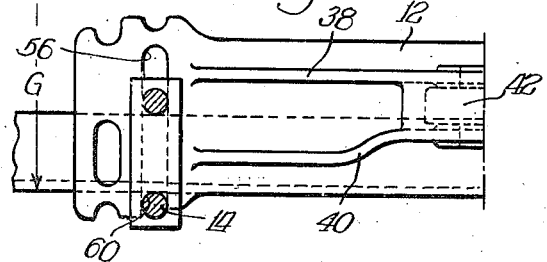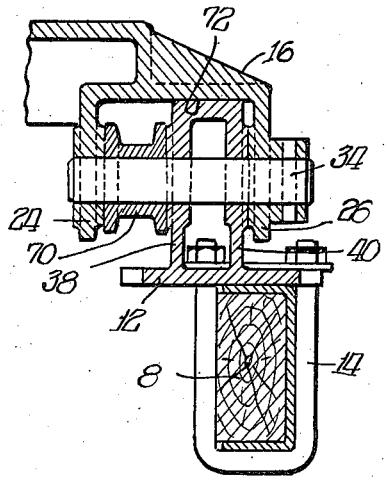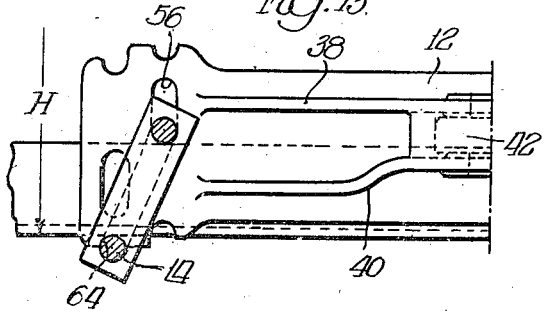

2,336,939

UNITED STATES PATENT OFFICE 2,336,939

FIFTH WHEEL MOUNTING

Edmund P. Kinne, Alliance, Ohio, assignor to American Steel Foundries, Chicago, Ill., a corporation of New Jersey Application September 6, 1940, Serial No. 355,561

12 Claims. (Cl. 280—33.1)

My invention relates to fifth wheel mountings for tractor and trailer combinations and more particularly to a novel form of supporting bracket which is suitable for application to tractor truck frames of different widths.

My invention contemplates supporting a single fifth wheel member on standard tractor truck frames of different widths by means of novel supporting brackets each designed to be positioned with respect to the fifth wheel member and secured to the associated truck frames in various combinations.

An object of my invention is to design an adjustable bracket for mounting fifth wheels which is of simple construction and conforms with manufacturing requirements.

A specific object of my invention is to design a reversible bracket which affords pivotal mounting for a fifth wheel in a tractor and trailer combination and which is adjustable to accommodate truck frames of varying widths.

A further object of my invention is to design a novel adjustable bracket for pivotally supporting a fifth wheel member on truck frames of varying widths wherein the supported load is taken directly by the bracket and the securing pivot pin is substantially relieved of shearing stresses.

Referring to the drawings, Figure 1 is a half top plan view of a fifth wheel mounting embodying my invention, the other half thereof being similarly arranged.

Figure 2 is a fragmentary side elevation of the structure shown in Figure 1.

Figure 3 is a fragmentary sectional view of the structure shown in Figure 1 with the frame member removed, the section being taken substantially in the transverse vertical plane indicated by the line 3—3 of Figure 1.

Figure 4 is a side elevation showing my novel bracket in greater detail, and Figure 5 is a top plan view thereof.

Figures 6 and 7 are half top plan views of my novel bracket showing two different securing arrangements for mounting a fifth wheel on truck frames of varying widths, the other half of said brackets being similarly arranged, and Figure 6 being an arrangement for a truck frame of minimum width. Figure 7A is a fragmentary sectional view showing the relative positions of the bracket and the fifth wheel member for the arrangements shown in Figures 6 and 7, the section being taken substantially in the same transverse vertical plane as that of Figure 3.

Figures 8 and 9 are half plan views of my novel bracket showing securing arrangements for mounting a fifth wheel member on truck frames of slightly greater widths, the other half of said bracket not being shown inasmuch as it is similarly arranged, and Figure 8A is a fragmentary sectional view taken in substantially the same plane as that of Figure 3 showing the relative positions of the bracket and a fifth wheel member secured as shown in Figures 8 and 9.

Figures 10 and 11 are half plan views of my novel bracket showing securing arrangements for mounting a fifth wheel member on truck frames of still greater widths, the other half of said bracket not being shown inasmuch as it is similarly arranged, and Figure 10A is a fragmentary sectional view taken in substantially the same plane as that of Figure 3 showing the relative positions of the bracket and a fifth wheel member secured as shown in Figures 10 and 11.

Figures 12 and 13 are half plan views of my novel bracket showing securing arrangements for mounting a fifth wheel member on truck frames of maximum widths, the other half of said bracket not being shown inasmuch as it is similarly arranged, and Figure 12A is a fragmentary sectional view taken in substantially the same plane as that of Figure 3 showing the relative positions of the bracket and a fifth wheel member secured as shown in Figures 12 and 13.

Describing my novel invention in detail, the fifth wheel generally indicated at 2 comprises a flat fifth wheel plate 4 bifurcated as at 6 to receive an engaging member (not shown) on the trailer for interlocking with the fifth wheel to couple the tractor with the trailer. On each side of the tractor truck frame 8 the fifth wheel may be pivotally supported as at 10 from my novel bracket 12 secured in any convenient manner to said frame by securing members 14, 14 such as U bolts. A rectangular bearing plate 15 seated on each end of the bracket 12 may be afforded for the securing members 14, 14. Each pivotal connection 10 includes a downwardly projecting bracket 16 (Figure 3) having a longitudinal vertical flange 18 integrally formed with the top chord 20 of the plate 4. Integrally formed with the lower edge of flange 18 and extending therefrom in opposite directions may be an arcuate wall 22 having depending inner and outer spaced lugs 24 and 26 forming therewith a substantially U-section as best seen in Figure 3. A central vertical rib 28 and the longitudinally flaring side ribs 30, 30 reinforce the bracket 16. Lugs 24 and 26 may be formed with relatively thick central sections affording convenient bearing pads, the outer bearing pad on lug 26 being enlarged to receive the bolt 32 securing the pivot pin 34.

My novel bracket generally indicated at 12 is shown in detail in Figures 4 and 5 and comprises a relatively long rectangular flat base plate 36 having spaced vertically upstanding longitudinal ribs or flanges 38 and 40 tapering upwardly from their ends to merge with the central load bearing portion 42. It should be noted that the central bearing portion 42 is offset from the longitudinal center line of the bracket 12 and the upstanding flange 40 may be flared laterally inward as at 44, 44 to merge with the bearing portion 42. The central bearing portion 42 includes a substantially semi-circular arcuate wall 48 extending between the flanges 38 and 40 and having its outer surface in abutment as at 50 with the inner surface on the arcuate wall 22 of the bracket 16. The engaging surfaces on the semi-circular wall 48 of the bracket and the arcuate wall 22 on the fifth wheel member may be made smooth to afford relative rotation therebetween during coupling. Centrally raised bearing pads are afforded on each flange 38 and 40 at the central bearing portion 42, and centrally aligned openings 52, 52 in said flanges receive the pivot pin 34.

Each enlarged end 54 on said plate 36 may be of unsymmetric form and of slightly greater width than that of the plate. Similarly arranged inner sets of slots 56, 56 and notches 58, 58 and 60, 60 may be formed in opposite ends 54, 54, said slots 56, 56 being formed adjacent opposite ends of the flange 38. The notches 58, 58 and 60, 60 may be laterally aligned with the slots 56, 56, said notches 58, 58 being formed on the edge of the plate adjacent flange 38, and notches 60, 60 being formed on the opposite edge of said plate and being spaced from said slots 56, 56 a greater distance than the notches 58, 58. Outer sets of slots 62, 62 and laterally aligned notches 64, 64 and 66, 66 in opposite ends 54, 54 may be diagonally spaced outwardly from the inner set of slots 56, 56 and notches 58, 58 and 60, 60. Notches 64, 64 may be formed on the edge of the bracket adjacent notches 60, 60, and notches 66, 66 may be formed on the opposite edge of said bracket adjacent notches 58, 58, said notches 66, 66 being spaced a greater distance from the slot 62 than the notches 64, 64. It may be noted that the spacing of the outer and inner sets of slots and notches in ends 54, 54 may be along oppositely directed diagonal lines. It will be apparent that the diagonal spacing of the outer sets of slots and notches with respect to the inner sets of slots and notches will afford numerous combinations for conveniently securing my novel bracket in various positions to truck frames of different widths and yet afford a pivotal connection for a single fifth wheel member. This may be best understood by a consideration of Figures 6 to 13.

Figures 7A, 8A, 10A, and 12A show different arrangements of my novel reversible bracket 12 and the bracket 16 on the fifth wheel member for mounting said member on truck frames of different widths, and Figures 6, 7, 8, 9, 10, 11, 12, and 13 show different arrangements for securing the bracket 12 to frame members for accommodating the single fifth wheel member on said truck frames. In Figure 7A is shown the relative positions of the bracket 12 and the bracket 16 on the fifth wheel member for the accommodation of said fifth wheel to truck frames of minimum width such as A and B. It may be noted that the central portion of the flange 40 of the bearing portion 42 abuts as at 68 the inner lug 24 on the bracket 16. Interposed between the flange 38 and the outer lug 26 may be a spacer or filler block 70 to substantially eliminate lateral play between the fifth wheel member and the bracket. The pivot pin 34 extends through aligned openings in the brackets 16 and 12 and the spacer 70, and may be secured by the bolt 32 as aforedescribed. The manner of securing the bracket 12 to a truck frame of minimum width A, such as 33 inches, is shown in Figure 6, wherein each securing bolt 14 is inserted in the outer slot 62 and the aligned notch 66. In Figure 7 a securing arrangement for a truck frame of slightly greater width B, such as 34 inches is shown, and for this width it may be noted that each securing bolt 14 is inserted in the outer slot 62 and the diagonally spaced inner notch 58.

In Figure 8A the bracket 12 is shown applied to truck frames having widths indicated at C and D, such as 33 inches and 34 inches, (Figures 8 and 9). It will be noted that in this arrangement the bracket 12 has been reversed so that the vertical flange 38 is in abutment with the lug 24, and the flange 40 has abutment with the spacer block 70. For securing the bracket to a frame of C width each securing bolt 14 may be inserted in the inner slot 56 and the aligned notch 60, as shown in Figure 8. In Figure 9 a securing arrangement for a frame of width D is shown, and each securing bolt 14 may be inserted in the inner slot 56 and the notch 64 diagonally spaced therefrom.

It may be noted that in Figures 7A and 8A which show application of a fifth wheel member to truck frames of widths A to D, the load bearing portion 42 has abutment as at 50 with the inner surfaces of the arcuate wall 22 adjacent lug 24 and the vertical flange 18.

The relative position of my novel bracket with respect to a single fifth wheel member supported on truck frame widths E and F, such as 37 inches and 38 inches, is shown in Figure 10A, wherein it may be noted that the central load bearing portion 42 has abutment as at 72 with the arcuate wall 22 adjacent lug 26 and outwardly of flange 18 on the bracket 16. The vertical flange 38 on the bracket 12 has abutment as at 74 with the lug 26 on the bracket 16, and the spacer block 70 is positioned between the flange 40 and the lug 24. For the truck frame width E each securing bolt 14 may be inserted through the slot 62 and the notch 66, and for the truck frame width F each securing bolt 14 may be inserted through the slot 62 and the diagonally spaced notch 58.

For truck frame widths G and H, such as 39 inches and 40 inches, the bracket 12 may be reversed from the position shown in Figure 10A so that the flange 40 has abutment with the lug 26, and the filler 70 is positioned between the flange 38 and the lug 24. For width G each securing member 14 may be inserted through slot 56 and notch 60, and for width H each securing member 14 may be inserted through slot 56 and the diagonally arranged notch 64.

It may be noted that the abutment between the central load bearing portion 42 and the arcuate wall 22 substantially relieves the pivot pin 34 from shearing stresses.

It is thus apparent that I have designed a reversible and adjustable bracket which may be used for mounting fifth wheels on tractor truck frames varying in width from distances A to H or 33 inches to 40 inches. The practicability of such a bracket is readily apparent.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In tractor and trailer vehicles, coupling means including a fifth wheel member and a bracket affording pivotal support for said member, said support comprising a pivot member, spaced lugs on opposite sides of said fifth wheel member, and load bearing means on said brackets adapted to be selectively arranged between said spaced lugs and having abutment with said fifth wheel member, said brackets including end portions with sets of spaced slots and notches formed and arranged for cooperation with said load bearing means whereby said fifth wheel member may be supported on tractor truck frames of varying widths.

2. In a tractor and trailer combination, a fifth wheel member having on opposite sides thereof spaced depending lugs, and reversible brackets each comprising a base having sets of transversely aligned securing means in opposite ends thereof and upstanding means abutting said member and formed and arranged to be selectively positioned between and secured to said lugs whereby said securing means may be adjustably positioned with respect to vehicle frames of varying widths.

3. In a fifth wheel mounting, a fifth wheel member, spaced depending lugs on opposite sides thereof, and adjustable brackets adapted to support said member on vehicle frames of varying widths, each bracket comprising widened end portions having spaced means accommodating securing members and a load bearing member offset from the longitudinal center line thereof and adapted to be selectively positioned between said lugs whereby said means may be adjustably positioned with respect to said frames.

4. Reversible supporting means for connecting a fifth wheel member to a supporting frame comprising a flat plate having end portions each comprising sets of transversely aligned means offset laterally with respect to each other for the accommodation of associated securing members, and a load bearing member offset with respect to the longitudinal axis of said plate and formed and arranged for reversible engagement with said fifth wheel member whereby said aligned means may be adjustably positioned.

5. A reversible supporting bracket for a coupling member comprising a base having an arcuate load bearing portion intermediate its ends and end portions with spaced means accommodating associated securing members in various combinations, said bearing portion and said spaced means being offset from the longitudinal center line of said bracket, and said bearing portion being formed and arranged for reversible engagement with said coupling member whereby said spaced means may be adjustably positioned with respect to associated frame members of varying widths.

6. In a vehicle, a coupling member and means for supporting said member on associated vehicle frames of varying widths, said means comprising a reversible bracket having load bearing means offset from the longitudinal center line thereof and formed and arranged for reversible engagement with said coupling member, and sets of diagonally spaced means on each end of said bracket adapted to cooperate with said load bearing means whereby said coupling member may be adjustably secured to said frames.

7. Adjustable supporting means for a coupling member comprising a base having end portions comprising sets of diagonally spaced means adapted to receive associated members for securing said supporting means to vehicle frames of different widths, said base having load bearing means intermediate its ends and formed and arranged to be selectively engaged with said coupling member whereby said spaced means may be adjustably positioned with respect to said frames.

8. An adjustable supporting bracket for a fifth wheel member comprising a base having means laterally offset with respect to the longitudinal center line of said bracket for accommodation of truck frames of varying widths, one of said means including spaced sets of slots and notches at opposite ends of said base and the other of said means including a bearing portion adapted to be selectively arranged for connection to said fifth wheel member whereby said sets of slots and notches may be adjustably positioned with respect to vehicle frames of different widths.

9. A supporting bracket for a coupling member comprising a base having upstanding means laterally offset with respect to the longitudinal center line of said bracket and adapted to be adjustably positioned with respect to said member, and widened end portions having corresponding sets of transversely aligned means adapted to cooperate with said upstanding means whereby said coupling member may be adjustably secured to vehicle frames of different widths.

10. A supporting bracket for a coupling member comprising a base having upstanding means laterally offset with respect to the longitudinal center line of said bracket and adapted to be adjustably secured to said member and widened end portions having corresponding diagonally spaced sets of transversely aligned slots and notches formed and arranged for cooperation with said upstanding means whereby said coupling member may be secured to vehicle frames of different widths.

11. In a vehicle, a coupling member and means for supporting said member on associated vehicle frames of varying widths, said means comprising a reversible bracket having spaced sets of slots and notches at opposite ends thereof, and a bearing portion adapted to be reversibly positioned for connection to said member whereby said sets of slots and notches may be adjustably positioned with respect to said frames.

12. In tractor and trailer vehicles, coupling means including a fifth wheel member and a bracket affording a pivotal support for said member on tractor truck frames of varying widths, said supports comprising spaced lugs on said member, spaced slots and notches at opposite ends of said bracket, and a bearing portion intermediate said ends and adapted to be adjustably positioned between and connected to the associated lugs whereby said sets of slots and notches may be adjustably positioned with respect to said frames.

EDMUND P. KINNE.